(12) United States Patent
Regnat et al.

(10) Patent No.: US 11,519,643 B2
(45) Date of Patent: Dec. 6, 2022

(54) THERMAL SWITCH

(71) Applicant: KIUTRA GMBH, Munich (DE)

(72) Inventors: Alexander Regnat, Oberhaching (DE); Jan Spallek, Munich (DE)

(73) Assignee: KIUTRA GMBH, Munich (DE)

( * ) Notice: Subject to any disclaimer, the term of this patent is extended or adjusted under 35 U.S.C. 154(b) by 0 days.

(21) Appl. No.: 17/625,879

(22) PCT Filed: Jul. 13, 2020

(86) PCT No.: PCT/EP2020/069795
§ 371 (c)(1),
(2) Date: Jan. 10, 2022

(87) PCT Pub. No.: WO2021/009140
PCT Pub. Date: Jan. 21, 2021

(65) Prior Publication Data
US 2022/0260287 A1    Aug. 18, 2022

(30) Foreign Application Priority Data
Jul. 15, 2019    (DE) .......................... 102019119099.1

(51) Int. Cl.
| F25D 19/00 | (2006.01) |
| F17C 3/08 | (2006.01) |
| F25B 9/10 | (2006.01) |
| F25B 21/00 | (2006.01) |

(52) U.S. Cl.
CPC ............ F25B 21/00 (2013.01); F25D 19/006 (2013.01); *F17C 3/085* (2013.01); *F25B 9/10* (2013.01); *F25B 2321/002* (2013.01)

(58) Field of Classification Search
CPC .......... F25D 19/006; F17C 3/085; F25B 9/10; F25B 2321/002
See application file for complete search history.

(56) References Cited

U.S. PATENT DOCUMENTS

| 2016/0084440 A1 | 3/2016 | Strobel |
| 2019/0353419 A1* | 11/2019 | Takahashi ............. F25D 19/006 |

FOREIGN PATENT DOCUMENTS

| EP | 2810312 B1 | 12/2015 |
| GB | 2538512 A | 11/2016 |

OTHER PUBLICATIONS

International Search Report and Written Opinion dated Oct. 15, 2020 issued in PCT/EP2020/069795.

* cited by examiner

*Primary Examiner* — Ana M Vazquez
(74) *Attorney, Agent, or Firm* — Scully Scott Murphy and Presser

(57) ABSTRACT

An apparatus is provided that includes a first thermal device; a second thermal device: and a connection element configured to connect the first thermal device to the second thermal device.

18 Claims, 3 Drawing Sheets

THERMAL SWITCH

FIELD

The present disclosure relates to an apparatus, a system having the apparatus, and a method of operating the apparatus. The present disclosure particularly relates to a mechanical thermal switch for use inside a vacuum chamber, and in particular a vacuum chamber of a cryostat such as a multi-stage adiabatic demagnetization refrigerator.

BACKGROUND

A cryostat is generally used to maintain low temperatures of samples mounted within the cryostat. Low temperatures may be achieved by using, for example, a cryogenic fluid bath such as liquid helium. However, the cooling medium, such as liquid helium, continuously evaporates due to external and/or internal heat input in the cryostat and therefore needs to be refilled regularly. This requires considerable time and resources, whereby the operating costs of such cryostats are high.

In order to overcome the above drawbacks, cryogen-free cryostats have been developed. Cryogen-free cryostats may employ a cryogen-free closed cycle system, such a pulse tube cryocooler. Modern pulse tube cryocoolers can achieve temperatures down to 1.2K. In order to achieve sub-Kelvin temperatures, a magnetic cooling stage can be used in addition to the cryogen-free closed cycle system. The magnetic cooling stage may be an adiabatic demagnetization refrigerator (ADR), which can achieve temperatures down to a few milli-Kelvin. ADR is based on the magneto-caloric effect. When a medium is magnetized its magnetic moments get aligned and the heat of magnetization is released. Vice versa, if the medium is demagnetized its temperature drops.

In particular at sub-Kelvin temperatures, heat input in the cryostat is crucial. The inside of the cryostat needs to be thermally insulated from the outside. For this purpose, it may be beneficial to reduce a heat input in the vacuum chamber, and in particular a heat input to low-temperature stages, such as milli-Kelvin stages.

In view of the above, new apparatuses, systems having the apparatus, and methods of operating the apparatus, that overcome at least some of the problems in the art are beneficial.

SUMMARY

In light of the above, an apparatus, a system having the apparatus, and a method of operating the apparatus are provided.

It is an object of the present disclosure to reduce a heat input into a vacuum chamber. It is another object to provide a mechanical thermal switch which is suitable for use at ultra-low temperatures, and in particular in the milli-Kelvin range. Further aspects, benefits, and features of the present disclosure are apparent from the claims, the description, and the accompanying drawings.

According to an aspect of the present disclosure, an apparatus is provided. The apparatus includes a first thermal device; a second thermal device; and a connection element configured to connect the first thermal device and the second thermal device. The connection element may be configured to mechanically and thermally connect the first thermal device and the second thermal device.

According to some embodiments, which can be combined with other embodiments described herein, the connection element is configured to releasably connect the first thermal device and the second thermal device.

According to some embodiments, which can be combined with other embodiments described herein, the first thermal device includes the connection element.

According to some embodiments, which can be combined with other embodiments described herein, the second thermal device has an accommodation space configured to accommodate the connection element of the first thermal device.

According to some embodiments, which can be combined with other embodiments described herein, the connection element is deformable and/or has a variable diameter.

According to some embodiments, which can be combined with other embodiments described herein, the connection element is a hollow cylinder and/or has one or more slits or cut-outs. For example, the connection element is a hollow cylinder having one or more slits or cut-outs.

According to some embodiments, which can be combined with other embodiments described herein, the apparatus further includes a plug.

According to some embodiments, which can be combined with other embodiments described herein, the plug is insertable in the connection element.

According to some embodiments, which can be combined with other embodiments described herein, the plug is configured to deform the connection element and/or enlarge the variable diameter of the connection element to establish mechanical contact between the connection element and the second thermal device.

According to some embodiments, which can be combined with other embodiments described herein, the plug has an anti-stick coating (also known as "non-stick coating" or "anti-adhesive coating") on an outer surface thereof. For example, the anti-stick coating may include at least one material selected from the group including polytetrafluoroethylene (PTFB, e.g. Teflon) and molybdenum sulphide.

According to some embodiments, which can be combined with other embodiments described herein, the anti-stick coating is a hard coating. In other words, the anti-stick coating is not a fluid or lubricant such as vacuum grease.

According to some embodiments, which can be combined with other embodiments described herein, the apparatus further includes a displacement mechanism configured to displace the plug parallel to a first direction or displacement direction.

According to some embodiments, which can be combined with other embodiments described herein, the first direction or displacement direction is essentially parallel to a vertical direction and/or a longitudinal axis of the apparatus.

According to some embodiments, which can be combined with other embodiments described herein, the displacement mechanism includes at least one first thread or rod having a first end connected to the plug and a second end connected to an actuator.

According to some embodiments, which can be combined with other embodiments described herein, the at least one first thread or rod extends through an interior of the first thermal device.

According to some embodiments, which can be combined with other embodiments described herein, the displacement mechanism includes at least one elastic element and at least one second thread or rod having a first end connected to the plug and a second end connected to the at least one elastic element e.g. directly or indirectly via an anchor.

According to some embodiments, which can be combined with other embodiments described herein, the displacement mechanism includes an anchor. A first end of the at least one elastic element is connected to, or abuts against, the anchor. Optionally, a second end of the at least one elastic element is connected to, or abuts against, a support structure of the apparatus. The anchor can be moveable in a direction essentially parallel to the displacement direction of the plug.

According to some embodiments, which can be combined with other embodiments described herein, the at least one elastic element is a spring.

According to some embodiments, which can be combined with other embodiments described herein, the at least one second thread or rod extends through an interior of the second thermal device.

According to some embodiments, which can be combined with other embodiments described herein, the second thermal device is located between the first thermal device and the at least one elastic element.

According to some embodiments, which can be combined with other embodiments described herein, the first thermal device and/or the second thermal device has a cylindrical shape.

According to some embodiments, which can be combined with other embodiments described herein, the apparatus further includes a support structure configured to support the first thermal device and/or the second thermal device.

According to some embodiments, which can be combined with other embodiments described herein, the first thermal device is configured as a first temperature stage of a first temperature and/or the second thermal device is configured as a second temperature stage of a second temperature and/or the support structure is configured as a third temperature stage of a third temperature.

According to some embodiments, which can be combined with other embodiments described herein, the second temperature is lower than the first temperature and/or the first temperature is lower than the third temperature and/or the second temperature is lower than the third temperature.

According to some embodiments, which can be combined with other embodiments described herein, the first temperature is equal to or higher than 1K and equal to or lower than 4K, and/or the second temperature is equal to or lower than 1K, and/or the third temperature is equal to or higher than 4K.

According to some embodiments, which can be combined with other embodiments described herein, the apparatus further includes a first holding structure configured to hold the first thermal device.

According to some embodiments, which can be combined with other embodiments described herein, the first holding structure is configured to hold the first thermal device in a suspended state.

According to some embodiments, which can be combined with other embodiments described herein, the first holding structure includes at least one first holding thread or rod.

According to some embodiments, which can be combined with other embodiments described herein, the at least one first holding thread or rod has a first end connected to the support structure and a second end connected to the first thermal device.

According to some embodiments, which can be combined with other embodiments described herein, the apparatus further includes a first pre-tensioning mechanism at the support structure.

According to some embodiments, which can be combined with other embodiments described herein, the first end of the at least one first holding thread or rod is connected to the first pre-tensioning mechanism.

According to some embodiments, which can be combined with other embodiments described herein, the apparatus further includes a second holding structure configured to hold the second thermal device.

According to some embodiments, which can be combined with other embodiments described herein, the second holding structure is configured to hold the second thermal device in a suspended state.

According to some embodiments, which can be combined with other embodiments described herein, the second holding structure includes at least one second holding thread or rod.

According to some embodiments, which can be combined with other embodiments described herein, the at least one second holding thread or rod has a first end connected to the support structure and a second end connected to the second thermal device.

According to some embodiments, which can be combined with other embodiments described herein, the apparatus further includes a second pre-tensioning mechanism at the support structure.

According to some embodiments, which can be combined with other embodiments described herein, the first end of the at least one second holding thread or rod is connected to the second pre-tensioning mechanism.

According to some embodiments, which can be combined with other embodiments described herein, the first thermal device and/or the second thermal device are arranged in an interior of the support structure. For example, the support structure may surround the first thermal device and/or the second thermal device.

According to some embodiments, which can be combined with other embodiments described herein, the apparatus is configured for thermally connecting and disconnecting (e.g. two different) temperature areas or regions in a vacuum chamber, such as the area of the first temperature and the area of the second temperature. Preferably, the vacuum chamber is a vacuum chamber of a cryostat.

According to some embodiments, which can be combined with other embodiments described herein, the apparatus is a thermal switch or heat switch. Preferably, the apparatus is a mechanical thermal switch or mechanical heat switch.

According a further independent aspect of the present disclosure, a system is provided. The system includes a vacuum chamber and the apparatus according to the embodiments of the present disclosure. In particular, the apparatus may include a first thermal device; a second thermal device; and a connection element configured to (mechanically and thermally) connect the first thermal device and the second thermal device.

According to some embodiments, which can be combined with other embodiments described herein, the system is a cryostat.

According to some embodiments, which can be combined with other embodiments described herein, the system is an adiabatic demagnetization refrigerator. Preferably, the system is a multi-stage adiabatic demagnetization refrigerator.

According a further independent aspect of the present disclosure, a method of operating the apparatus according to the embodiments of the present disclosure is provided. The method includes establishing a mechanical contact between the connection element, the first thermal device, and the second thermal device.

According to some embodiments, which can be combined with other embodiments described herein, the method includes releasing the mechanical contact at least between the connection element and the second thermal device.

Embodiments are also directed at apparatuses for carrying out the disclosed methods and include apparatus parts for performing each described method aspect. These method aspects may be performed by way of hardware components, a computer programmed by appropriate software, by any combination of the two or in any other manner. Furthermore, embodiments according to the disclosure are also directed at methods for operating the described apparatus. It includes method aspects for carrying out every function of the apparatus.

BRIEF DESCRIPTION OF THE DRAWINGS

So that the manner in which the above recited features of the present disclosure can be understood in detail, a more particular description of the disclosure, briefly summarized above, may be had by reference to embodiments. The accompanying drawings relate to embodiments of the disclosure and are described in the following.

DETAILED DESCRIPTION OF EMBODIMENTS

Figure 1:
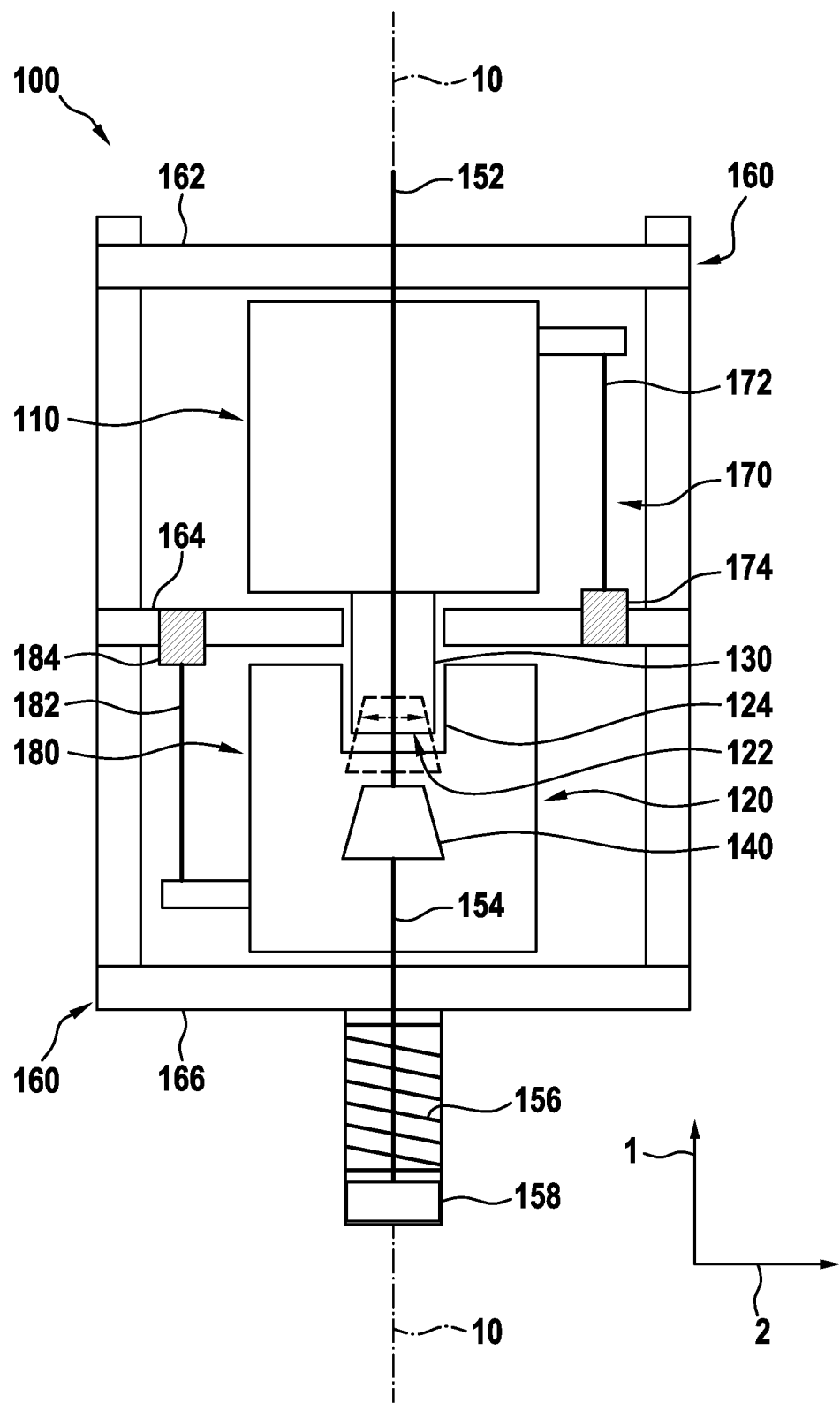
FIG. 1 shows a schematic view of an apparatus according to embodiments described herein.

Reference will now be made in detail to the various embodiments of the disclosure, one or more examples of which are illustrated in the figures. Within the following description of the drawings, the same reference numbers refer to same components. Generally, only the differences with respect to individual embodiments are described. Each example is provided by way of explanation of the disclosure and is not meant as a limitation of the disclosure. Further, features illustrated or described as part of one embodiment can be used on or in conjunction with other embodiments to yield yet a further embodiment. It is intended that the description includes such modifications and variations.

At low and ultra-low temperatures, it may be beneficial to reduce a transfer of heat into the vacuum chamber. In particular, it is beneficial to prevent the occurrence of heat leaks.

Thermal switches, also called heat switches, are devices with at least two switchable thermal conductivities. As such they are an important building block of thermal management systems, especially in cooling devices of multiple stages. A thermal switch is characterized by the following criteria.

The switching ratio: The ratio of "on" conductivity to "off" conductivity. Generally, a high switching ratio is desired, the optimum being a very high "on" conductivity and a zero "off" conductivity. As in real systems this is not achievable, the actual thermal switch may be designed to exhibit very large "on" conductivities while accepting a less than optimal "off" conductivity.

The kind of actuation: There are many thermal switch designs, e.g. mechanical, electromechanical, electrocaloric, liquid crystal, gas gap, superconducting etc. Each type of thermal switch has advantages and disadvantages depending of the desired field of operation.

The operating temperature: Many thermal switches only work in certain temperature regimes, as the physical effects used may be small or non-existent outside of a certain temperature range. One example is the superconducting thermal switch, which needs to operate in the superconducting phase of the switch material.

Mechanical thermal switches may be optimized for operation at ultra-low temperatures. Generally, mechanical thermal switches are well suited for operation in almost all temperature ranges and exhibit a superior switching ratio compared to most other technologies. As they tend to be bulky (they need to generate high force to ensure good thermal connection) and contain moving parts, in many applications there are better alternatives. In the low temperature regimes (less than 4K) however, where the cooling power of refrigeration systems rapidly decreases and thermal conductivities are low, the high switching ratio and low "off" conductance of the mechanical thermal switch is very attractive.

While at 4K most cryogenic systems provide enough cooling power to absorb the heat produced by moving parts while operating the switch, as well as a sturdy suspension absorbing the high forces, at lower temperatures this quickly becomes problematic at operating temperatures below 4K. The combined heat leak through the suspension, the connection to the actuator (e.g. a shaft) and the heat produced in switching, may be higher than the cooling power of a lower temperature refrigerator stage.

The embodiments of the present disclosure overcome these drawbacks and allow for the usage of mechanical thermal switches at temperatures significantly lower than currently possible.

FIG. 1 shows a schematic view of an apparatus 100 according to embodiments described herein.

The apparatus 100 is a thermal switch, and in particular a mechanical thermal switch. The word "mechanical" is to be understood in the sense that a thermal connection is achieved by means of a mechanical contact. The mechanical connection distinguishes the mechanical thermal switch from, for example, a superconducting thermal switch which use superconductivity to provide a thermal connection.

The apparatus 100 may be configured for thermally connecting and disconnecting two different temperature areas or regions in a vacuum chamber, and in particular a vacuum chamber of a cryostat. The cryostat may be, but is not limited to, an adiabatic demagnetization refrigerator, and in particular a multi-stage adiabatic demagnetization refrigerator.

Turning now to FIG. 1, the apparatus 100 includes a first thermal device 110, a second thermal device 120, and a connection element 130 configured to connect the first thermal device 110 and the second thermal device 120. The connection element 130 is configured to provide a mechanical contact, and thus thermal contact, between the first thermal device 110 and the second thermal device 120.

For example, the connection element 130 may be configured to releasably connect the first thermal device 110 and the second thermal device 120. In particular, the apparatus 100 may be configured to have a closed state and an open state. In the closed state, the connection element 130 provides the mechanical contact and thus the thermal contact between the first thermal device 110 and the second thermal device 120. In the open state, the connection element 130 is released and does not provide the mechanical contact between the first thermal device 110 and the second thermal device 120. In other words, in the open state there is no mechanical contact at least between the connection element 130 and the first thermal device 110 and/or the second thermal device 120. Thereby, the first thermal device 110 and the second thermal device 120 can be thermally insulated from each other and can be held at different temperatures.

In some embodiments, the first thermal device 110 includes the connection element 130. The second thermal device 120 may have an accommodation space 122 configured to accommodate the connection element 130 of the first thermal device 110. The connection element 130 may contact an inner wall 124 of the accommodation space 122 in the closed state of the apparatus 100, and may not contact the inner wall 124 of the accommodation space 122 in the open state of the apparatus 100. In the open state, there may be a gap between the inner wall 124 of the accommodation space 122 and the connection element 130. The gap may be 0.5 mm or larger, preferably 1 mm or larger, and more preferably 2 mm or larger. Additionally, or alternatively, the gap can be 5 mm or less, preferably 3 mm or less, preferably 2 mm or less, and more preferably 1 mm or less. The gap may be defined in a horizontal direction 2.

According to some embodiments, the first thermal device 110 and/or the second thermal device 120 and/or the connection element 130 and/or the accommodation space 124 have a cylindrical shape. The term "cylinder" can be understood as commonly accepted as having a circular bottom shape and a circular upper shape and a curved surface area or shell connecting the upper circle and the lower circle.

In some embodiments, the connection element 130 and the accommodation space 124 have corresponding shapes, such as cylindrical shapes. However, the present disclosure is not limited thereto, and the connection element 130 and the accommodation space 124 can have shapes other than the cylindrical shape.

The first thermal device 110 and/or the second thermal device 120 and/or the connection element 130 and/or the accommodation space 124 can have respective longitudinal axes. In particular, the first thermal device 110 may have a first longitudinal axis and/or the second thermal device 120 may have a second longitudinal axis and/or the connection element 130 may have a third longitudinal axis and/or the accommodation space 124 may have a fourth longitudinal axis. One or more of the first to fourth longitudinal axes, and preferably all of the first to fourth longitudinal axes, may coincide with each other. If a cylindrical shape is provided, the longitudinal axis/axes may correspond to a cylinder axis of the respective cylinder.

The first to fourth longitudinal axis may commonly be referred to as "the longitudinal axis 10 of the apparatus 100". The first to fourth longitudinal axes may be essentially parallel to a vertical direction 1, in particular when the apparatus 100 is mounted inside of the vacuum chamber.

The term "vertical direction" or "vertical orientation" is understood to distinguish over "horizontal direction" or "horizontal orientation". That is, the "vertical direction" or "vertical orientation" relates to an essentially vertical orientation e.g. of the first to fourth axes and/or the longitudinal axis 10 of the apparatus 100, wherein a deviation of a few degrees, e.g. up to 10° or even up to 15°, from an exact vertical direction or vertical orientation is still considered as an "essentially vertical direction" or an "essentially vertical orientation". The vertical direction can be essentially parallel to the force of gravity.

According to some embodiments, the connection element 130 may be deformable. For example, the connection element 130 may have a variable diameter. The variable diameter of the connection element 130 can be defined in a direction essentially perpendicular to the longitudinal axis 10. For example, the variable diameter of the connection element 130 can be defined in the horizontal direction 2. The variable diameter may have a first value in the open state and a second value in the closed state. The first value may be smaller than the second value. In other words, the diameter of the connection element 130 may be small(er) in the open state such that the connection element 130 does not contact the second thermal device 120. Further, the diameter of the connection element 130 may be large(r) in the closed state such that the connection element 130 contacts the second thermal device 120. In some embodiments, the second value of the closed state may essentially correspond to an inner diameter of the accommodation space 124.

To provide the variable diameter, the connection element 130 may have one or more slits or cut-outs. For example, the connection element 130 may be a hollow cylinder having one or more slits or cut-outs. The one or more slits or cut-outs may have a longitudinal extension which is essentially parallel to the longitudinal axis 10 of the apparatus 100. The number of slits or cut-outs may be two or more, and preferably two, three, four, five, six or more.

According to some embodiments, the apparatus 100 further includes a plug 140. The plug 140 may be insertable in the connection element 130, e.g. from below. The plug 140 may be configured to deform and/or enlarge the variable diameter of the connection element 130 to establish the mechanical contact between the connection element 130 and the second thermal device 120.

The plug 140 may have a cone shape, such as a truncated cone shape. The cone may have a first side (e.g. upper side or top side), a second side (e.g. lower side or bottom side), and a lateral side connecting the first side and the second side. A diameter of the first side may be smaller than a diameter of the second side. The plug 140 may be insertable in the connection element 130 from the first side. When the plug 140 is inserted in the connection element 130, the diameter of the connection element 130 may increase. When the plug 140 is removed from the connection element 130, the diameter of the connection element 130 may decrease.

In some implementations, the plug 140 may have an anti-stick coating (also known as "non-stick coating" or "anti-adhesive coating") on an outer surface thereof. For example, the anti-stick coating may include at least one material selected from the group including polytetrafluoroethylene (PTFE, e.g. Teflon) and molybdenum sulphide. The anti-stick coating may be a material layer which covers (or is coated on) a body 140 of the plug. The body 140 of the plug may be made of a different material, such as a copper, silver or gold. The anti-stick coating can reduce heat generation due to friction when inserting the plug 140 into the connection element 130 or removing the plug 140 from the connection element 130.

In some implementations, the apparatus 100 further includes a displacement mechanism configured to displace the plug 140 essentially parallel to a first direction or displacement direction. The first direction or displacement direction may be essentially parallel to the vertical direction 1 and/or the longitudinal axis 10 of the apparatus 100.

The term "essentially parallel" relates to an essentially parallel orientation e.g. of the longitudinal axis 10 and the displacement direction, wherein a deviation of a few degrees, e.g. up to 5° or even up to 10°, from an exact parallel orientation is still considered "essentially parallel".

According to some embodiments, the displacement mechanism includes at least one first thread 152 having a first end connected to the plug 140 (e.g. the first side thereof) and a second end connected to an actuator (not shown). The at least one first thread 152 may extend through an interior of the first thermal device 110. The actuator may be a motor, such as an electrical motor and/or a stepper motor. The actuator may be configured to move, e.g. wind up and/or pull, the at least one first thread 152 in the displacement direction to move the plug 140 towards the connection element 130 and thus the closed state. The at least one first thread 152 may extend through an interior of the first thermal device 110.

According to some embodiments, the displacement mechanism may include at least one elastic element 156 and at least one second thread 154. The at least one elastic element 156 may be a spring. The at least one second thread 154 may extend through an interior of the second thermal device 120. Additionally, or alternatively, the second thermal device 120 may be located between the first thermal device 110 and the at least one elastic element 156.

A first end of the at least one second thread 154 may be connected to the plug 140 (e.g. the second side thereof) and a second end of the at least one second thread 154 may be connected to a first end of the at least one elastic element 156, e.g. directly or indirectly via an anchor 158. For example, the first end of the at least one elastic element 156 may abut against the anchor 158 to which the second end of the at least one second thread 154 is connected. A second end of the at least one elastic element 156 may abut against the support structure 160. Thus, the at least one elastic element 158 may be interposed between the support structure 160 and the anchor 158

In some implementations, the anchor 158 can be moveable in a direction essentially parallel to the displacement direction of the plug 140 and/or the longitudinal axis 10. When the plug 140 moves, the anchor 158 may move in the same direction.

The actuator may be configured to hold the plug 140 via the at least one first thread 152 in the closed state, e.g. by providing a holding force. When the holding force is released, e.g. by unwinding the at least one first thread 152, the at least one elastic element 156 may provide a restoring force which moves the plug 140 in the displacement direction away from the connection element 130 and thus to the open state.

In the above description, the at least one first thread 152 and the at least one second thread 154 are provided as examples. In other embodiments, at least one first rod may be provided instead of the at least one first thread 152. Additionally, or alternatively, at least one second rod may be provided instead of the at least one second thread 154. The at least one first rod and/or the at least one second rod can be threaded rods, but are not limited thereto.

The at least one first rod and/or the at least one second rod may be made of a material having low thermal conductivity. Using a sturdy rod allows to actuate the thermal switch even without the use of the at least one elastic element 156 and the at least one second rod since the plug can be pulled (to close the switch) and pushed (to open the switch).

In the present disclosure, a thread can be understood as a filament, a group of filaments twisted together, or a filamentous length formed by spinning and twisting short fibers into a continuous strand. In contrast thereto, a rod can be understood as a straight and sturdy stick.

According to some embodiments, the apparatus 100 may further include the support structure 160 configured to support the first thermal device 110 and/or the second thermal device 120 and/or at least a part of the displacement mechanism, such as the at least one elastic element 156. The first thermal device 110 and/or the second thermal device 120 may be arranged in an interior of the support structure 160. For example, the support structure 160 may surround the first thermal device 110 and/or the second thermal device 120. In some implementations, the at least one elastic element 154 may be provided on an outside of the support structure 160, such as a lower side or bottom side of the support structure 160.

In some embodiments, the first thermal device 110 may be configured as a first temperature stage of a first temperature and/or the second thermal device 120 may be configured as a second temperature stage of a second temperature and/or the support structure 160 may be configured as a third temperature stage of a third temperature. The second temperature may be lower than the first temperature and/or the first temperature may be lower than the third temperature and/or the second temperature may be lower than the third temperature.

For example, the first temperature is equal to or higher than 1K and equal to or lower than 4K, and/or the second temperature is equal to or lower than 1K, and/or the third temperature is equal to or higher than 4K. The three-stage configuration reduces a heat input to the coldest stage, i.e., the second thermal device. Thereby, lower temperatures can be achieved at the coldest stage. Further, low temperature can be maintained more stably.

According to some embodiments, the apparatus 100 includes a first holding structure 170 configured to hold the first thermal device 110. Additionally, or alternatively, the apparatus 100 includes a second holding structure 180 configured to hold the second thermal device 120. The first holding structure 170 and the second holding structure 180 can be independent structures so as to be essentially thermally insulated from each other.

In some implementations, the first holding structure 170 is configured to hold the first thermal device 110 in a suspended state. Additionally, or alternatively, the second holding structure 180 is configured to hold the second thermal device 120 in a suspended state. Thereby, a contact between the first thermal device and its surroundings and/or a contact between the second thermal device 120 and its surroundings can be minimized, whereby in turn a heat input can be reduced.

The first holding structure 170 may include at least one first holding thread 172. The at least one first holding thread 172 may have a first end connected to the support structure 160 and a second end connected to the first thermal device 110. Additionally, or alternatively, the second holding structure 180 may include at least one second holding thread 182. The at least one second holding thread 182 has a first end connected to the support structure 160 and a second end connected to the second thermal device 120. The holding threads may minimize thermal conduction between the first thermal device 110 and the support structure 160 as well as between the second thermal device 120 and the support structure 160.

In some implementations, the at least one first holding thread 172 and/or the at least one second holding thread 182 may extend essentially parallel to the longitudinal axis 10 of the apparatus. The number of the at least one first holding thread 172 may be two, three, four, five, six, seven, eight, or even more. Likewise, the number of the at least one second holding thread 182 may be two, three, four, five, six, seven, eight, or even more. The holding threads 172, 182 may be equidistantly arranged around an outer circumference of the first thermal device 110 and the second thermal device 120, respectively.

In some embodiments, the first holding structure 170 and/or the first second holding structure 180 are symmetrically arranged around the first thermal device 110 and the second thermal device 120, respectively.

For example, one or more first holding threads 172 (e.g. three first holding threads) may extend from the first thermal device 110 along a first direction (e.g. upwards) to a first portion 162 of the support structure 160. Additionally, one or more further first holding threads 172 (e.g. three further first holding threads) may extend from the first thermal device 110 in a second direction opposite the first direction (e.g. downwards) to a second portion 164 of the support structure 160.

Likewise, one or more second holding threads 182 (e.g. three first holding threads) may extend from the second thermal device 120 along the first direction (e.g. upwards) to the second portion 164 of the support structure 160. Additionally, one or more further second holding threads 182 (e.g. three further second holding threads) may extend from the second thermal device 120 in the second direction opposite the first direction (e.g. downwards) to a third portion 166 of the support structure 160.

The upward and downward extending first and/or second holding threads 172, 182 may be alternately arranged around an outer circumference of the first thermal device 110 and the second thermal device 120, respectively.

In some implementations, the first portion 162, the second portion 164, and the third portion 166 may be rings which are sequentially arranged along the longitudinal axis 10. According to some embodiments, spacers can be provided between the first portion 162 and the second portion 164 as well as between the second portion 164 and the third portion 166.

According to some embodiments, the apparatus 100 includes a first pre-tensioning mechanism 174 at the support structure 160. The first end of the at least one first holding thread 172 may be connected to the first pre-tensioning mechanism 174. Thereby, the at least one first holding thread 172 can be tensioned to limit a movement of the first thermal device 110. In particular, the at least one first holding thread 172 can prevent a movement along the longitudinal axis 10 and/or the displacement direction of the plug 10. Since the at least one first holding thread 172 prevents a movement along the displacement direction, in some implementations no fixing means for the direction perpendicular to the displacement direction, such as the horizontal direction 2, is needed. A plurality of first pre-tensioning mechanisms 174 can be provided at suitable positions at the first portion 162 and/or the second portion 164 of the support structure 160.

According to some embodiments, the apparatus 100 includes a second pre-tensioning mechanism 184 at the support structure 160. The first end of the at least one second holding thread 182 may be connected to the second pre-tensioning mechanism 184. Thereby, the at least one second holding thread 182 can be tensioned to limit a movement of the second thermal device 120. In particular, the at least one second holding thread 182 can prevent a movement along the longitudinal axis 10 and/or the displacement direction of the plug 10. Since the at least one second holding thread 182 prevents a movement along the displacement direction, in some implementations no fixing means for the direction perpendicular to the displacement direction, such as the horizontal direction, is needed. A plurality of second pre-tensioning mechanisms 184 can be provided at suitable positions at the second portion 164 and/or the third portion 166 of the support structure 160.

In the above description, the at least one first holding thread 172 and the at least one second holding thread 182 are provided as examples. In other embodiments, at least one first holding rod may be provided instead of the at least one first holding thread 172. Additionally, or alternatively, at least one second holding rod may be provided instead of the at least one second holding thread 182. The at least one first holding rod and/or the at least one second holding rod can be threaded rods, but are not limited thereto. The at least one first holding rod and/or the at least one second holding rod may be made of a material having low thermal conductivity.

An operation of the opening and closing process is described in the following with reference to FIG. 1.

To close the thermal switch, the actuator pulls the at least one first thread 152 ("actuating thread"), moving the plug 140 ("spring displacer") towards the first thermal device, e.g. the first temperature, thereby deforming the connection element 130 ("transfer spring") and pressing the connection element 130 into the second thermal device 120 at the second temperature. The thread anchor 158 is moved alongside the plug 140, compressing the at least one elastic element 156 ("return spring"). The force exhibited is absorbed by the thread suspension 170, 180 and the support structure 160.

To open the thermal switch, the actuator releases the at least one first thread 152, allowing the at least one elastic element 156 to expand and move the switching assembly back to its original open state.

This mechanism may expel most of the heat generated by the moving parts e.g. to a thermal bath connected to the support structure 160, therefor minimising the heat absorbed by the low temperature areas. Additionally, as the return force is generated locally, a (thin) thread can be used to connect to the actuator, reducing heat leaks even further.

In some embodiments, the thermal switch includes, or consists of, three main temperature areas or regions, namely the first temperature (T1) at the first thermal device 110, the second temperature (T2) at the second thermal device 120, and the third temperature (T3) at the support structure 160.

The support structure 160 may be at the temperature of a thermal bath of sufficient cooling power, while the thermal switch connects/disconnects the two other temperature areas at T1 and T2. The thermal devices at T1 and T2 are independently suspended from the support structure 160 by the thread suspension. The threads are pretensioned by the pre-tensioning mechanisms (tensioning assemblies) to provide an automatic alignment between the two thermal devices 110, 120. The first thermal device at T1 is machined to have the "transfer spring" at a lower end thereof, which fits into a hole in the second thermal device 120 at T2, leaving only a gap less than one millimetre wide. The switching mechanism includes, or consists of, the plug 140, which sits on a thread. One side of this thread is connected to the actuator (e.g. an electric motor), while the other side is connected to the thread anchor 158.

To close the switch, the actuator pulls the actuating thread, moving the spring displacer towards T1, thereby deforming the transfer spring and pressing it into the corresponding part at T2. The thread anchor is moved alongside the spring displacer, compressing the return spring. The force exhibited is absorbed by the thread suspension and the support structure 160. To open the switch, the actuator releases the actuating thread, allowing the return spring to expand and move the switching assembly back to its original state.

The threads may be symmetric suspension elements. The first thermal device 110 and/or the second thermal device 120 may be suspended by six suspension threads, e.g. three up and three down.

Figure 2:
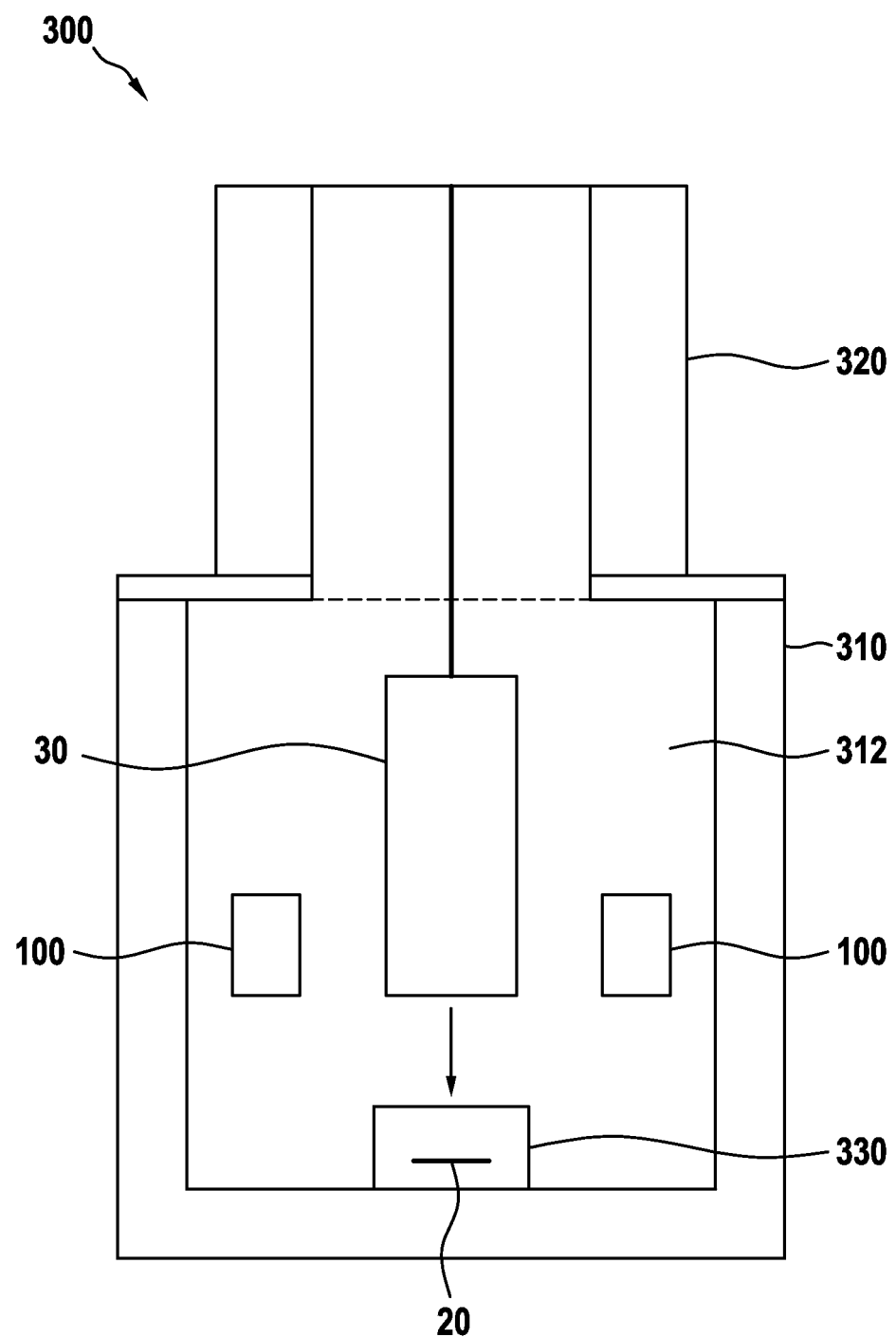
FIG. 2 shows schematic views of a system according to embodiments described herein.

FIG. 2 shows schematic views of a system 300 according to embodiments described herein. The system 300 can be a cryostat, such as a cryogen-free cryostat. The system 300 includes a vacuum chamber 310 and the apparatus 100 of the embodiments of the present disclosure.

The vacuum chamber 310 has an interior space 312 which is configured to contain a vacuum. The vacuum chamber 310 seals the interior space 312 from the outside essentially gas-tight, vacuum-tight, heat-impermeable, and/or radiation-impermeable. Optionally, the vacuum chamber 310 may electrically insulate the interior space 312 from the outside.

A vacuum is generally understood as a space essentially devoid of matter. The term "vacuum" as used throughout the present application is in particular understood as a technical vacuum, i.e., a region with a gaseous pressure much less than atmospheric pressure. The vacuum inside the vacuum chamber 310 can be high vacuum or ultra-high vacuum. One or more vacuum generation sources, such as turbo pumps and/or cryo pumps (not shown), can be connected to the vacuum chamber 310 to generate the vacuum.

According to some embodiments, the system 300 may be provided to measure one or more physical characteristics of a sample 20 at low or ultra-low temperatures. The one or more physical characteristics may include, but are not limited to, magnetization, resistivity, and conductivity. Optionally, the one or more physical characteristics of the sample can be measured under external conditions, such as external magnetic fields and/or pressure. The sample 20 may be loaded into the vacuum 310 and unloaded from the vacuum chamber using a sample transfer mechanism 30.

The system 300 may include an access port 320 having an inner space and a vacuum lock. The vacuum lock may seal the interior space 312 from the inner space of the access port 320 essentially vacuum-tight in a closed state, and may allow an access to the interior space 312 in an open state.

For example, the vacuum lock can be closed and a sample holder having the sample 20 attached thereto can be placed in the inner space of the access port 320 e.g. under atmospheric pressure. The inner space of the access port 320 can be sealed from the outside and a technical vacuum can be generated in the inner space. Then, the vacuum lock can be opened to connect the interior space 312 of the vacuum chamber 310 and the inner space of the access port 320. The sample holder can be inserted into the vacuum chamber 310 using the sample transfer mechanism 30. The sample holder can be mechanically attached to a base 330, the sample holder can be released from the sample transfer mechanism 30, and the sample transfer mechanism 30 can be removed from the inner space 312. The vacuum lock can be closed and the system 300 can be operated to examine the sample on the sample holder.

The system 300 can be configured to provide temperatures inside of the vacuum chamber in a range between 5 mK and 300K, particularly in a range between 5 mK and 250K, particularly in a range between 5 mK and 200K, particularly in a range between 5 mK and 150K, particularly in a range between 5 mK and 100K, and more particularly in a range between 5 mK and about 70K. In some implementations, even if the system is a cryostat, temperatures up to room temperature can be provided to conduct measurements on samples.

According to some embodiments, which can be combined with other embodiments described herein, the system 300 is an adiabatic demagnetization refrigerator, and in particular a multi-stage adiabatic demagnetization refrigerator. The multi-stage adiabatic demagnetization refrigerator may be configured to operate at 1K or below, particularly at 500 mK or below, particularly at 100 mK or below, and particularly at 50 mK or below. However, as mentioned above, the present disclosure is not limited thereto and the system 800 can be operated at higher temperatures, i.e. temperatures of 1K or higher, e.g. up to room temperature.

Figure 3:
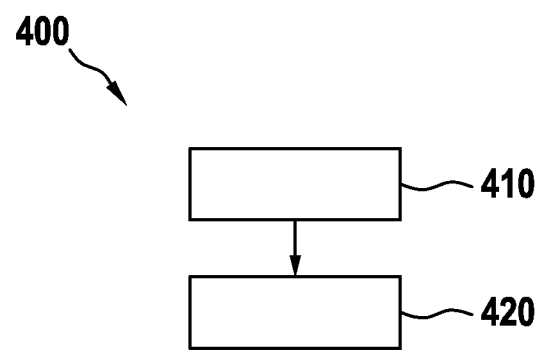
FIG. 3 shows a flow chart of a method of operating an apparatus according to embodiments described herein.

FIG. 3 shows a flow chart of a method 400 of operating an apparatus according to embodiments described herein.

The method 400 includes in block 410 establishing a mechanical contact between the connection element, the first thermal device, and the second thermal device. In some implementations, the method 400 further includes in block 420 releasing the mechanical contact at least between the connection element and the second thermal device.

According to embodiments described herein, the method of operating the apparatus can be conducted by means of computer programs, software, computer software products and the interrelated controllers, which can have a CPU, a memory, a user interface, and input and output means being in communication with the corresponding components of the apparatus.

While the foregoing is directed to embodiments of the disclosure, other and further embodiments of the disclosure may be devised without departing from the basic scope thereof, and the scope thereof is determined by the claims that follow.

The invention claimed is:

1. An apparatus, comprising:
   a first thermal device;
   a second thermal device;
   at least one elastic element;
   a connection element having a variable diameter and configured to releasably connect the first thermal device and the second thermal device, wherein the connection between the first thermal device and the second thermal device is releasable by means of a return force provided by the at least one elastic element; and
   a plug which is insertable in the connection element and configured to enlarge the variable diameter of the connection element to establish mechanical contact between the connection element and the second thermal device.

2. The apparatus of claim 1, wherein the first thermal device includes the connection element.

3. The apparatus of claim 2, wherein the second thermal device has an accommodation space configured to accommodate the connection element of the first thermal device.

4. The apparatus of claim 1, wherein the connection element is a hollow cylinder having one or more slits.

5. The apparatus of claim 4, wherein the plug has an anti-stick coating on an outer surface thereof.

6. The apparatus of claim 5, wherein the anti-stick coating includes at least one material selected from the group consisting of polytetrafluoroethylene and molybdenum sulphide.

7. The apparatus of claim 1, further including a displacement mechanism configured to displace the plug parallel to a displacement direction, wherein the displacement direction is parallel to at least one of a vertical direction and a longitudinal axis of the apparatus.

8. The apparatus of claim 7, wherein:
   the displacement mechanism includes at least one first thread or rod having a first end connected to the plug and a second end connected to an actuator, wherein the at least one first thread or rod extends through an interior of the first thermal device.

9. The apparatus of claim 7, wherein:
the displacement mechanism includes the at least one elastic element and at least one second thread or rod having a first end connected to the plug,
the at least one elastic element is a spring,
the at least one second thread or rod extends through an interior of the second thermal device, and
the second thermal device is located between the first thermal device and the at least one elastic element.

10. The apparatus of claim 9, wherein:
the displacement mechanism includes an anchor, wherein a second end of the at least one second thread or rod is connected to the anchor, and wherein the anchor is moveable parallel to the displacement direction of the plug.

11. The apparatus of claim 1, wherein:
the first thermal device is configured as a first temperature stage of a first temperature;
the second thermal device is configured as a second temperature stage of a second temperature; and
the second temperature is lower than the first temperature.

12. The apparatus of claim 11, wherein:
the first temperature is equal to or higher than 1K and equal to or lower than 4K; and
the second temperature is equal to or lower than 1K.

13. The apparatus of claim 1, wherein the apparatus further includes a support structure configured to support the first thermal device and the second thermal device, wherein the support structure is configured as a third temperature stage of a third temperature.

14. The apparatus of claim 13, wherein the third temperature is equal to or higher than 4K.

15. The apparatus of claim 13, wherein at least one of the first thermal device (110) and the second thermal device is arranged in an interior of the support structure.

16. The apparatus of claim 13, further comprising:
a first holding structure configured to hold the first thermal device, wherein the first holding structure is configured to hold the first thermal device in a suspended state, wherein the first holding structure includes at least one first holding thread or rod, and wherein the at least one first holding thread or rod has a first end connected to the support structure and a second end connected to the first thermal device.

17. The apparatus of claim 13, further comprising:
a second holding structure configured to hold the second thermal device, wherein the second holding structure is configured to hold the second thermal device in a suspended state, wherein the second holding structure includes at least one second holding thread or rod, and wherein the at least one second holding thread or rod has a first end connected to the support structure and a second end connected to the second thermal device.

18. An adiabatic demagnetization refrigerator, comprising:
a vacuum chamber; and
at least one apparatus of claim 1.

* * * * *